United States Patent [19]

Biba

[11] Patent Number: 4,773,441

[45] Date of Patent: Sep. 27, 1988

[54] LIQUID SEAL VENT

[76] Inventor: Pavel Biba, 13441 Beach St., Cerritos, Calif. 90701

[21] Appl. No.: 901,950

[22] Filed: Aug. 29, 1986

[51] Int. Cl.$^4$ ............................................. F16K 13/10
[52] U.S. Cl. .......................... 137/247.25; 137/247.33; 137/251.1; 137/253
[58] Field of Search ...................... 137/247.25, 247.33, 137/251.1, 253, 254; 220/85 VR, 85 VS, 205

[56] References Cited

U.S. PATENT DOCUMENTS

| | | | |
|---|---|---|---|
| 266,485 | 10/1882 | Lightbody | 137/247.25 X |
| 270,034 | 1/1883 | Edwards | 137/251.1 X |
| 1,371,866 | 3/1921 | Crompton | 137/254 |
| 1,651,051 | 11/1927 | Wiggins | 137/251.1 |
| 2,747,601 | 5/1956 | Quist | 137/253 |
| 3,721,429 | 3/1973 | Young | 137/253 |
| 3,833,014 | 9/1974 | Scheetz | 137/251.1 |

*Primary Examiner*—John Rivell

[57] ABSTRACT

The subject of this invention is a liquid seal vent, identified further in this specification as a "device", for use on a gas-blanketed liquid storage tank in safety-related applications where, due to safety reasons, the "device" must be functional even after it is hit by an external missile. The external missle is understood to be an airborne object; such as a telephone pole, piece of a ruptured pipe, or other objects which are routinely considered in the design of safety-related installations such as nuclear power plants.

The "device" contains sealing liquid, which is same or similar as the liquid in the tank. Besides providing a liquid seal, which is automatically maintained by a level control valve, the "device" automatically maintains the liquid in the tank's overflow pipe liquid seal.

The "device" automatically relieves the overpressure or vacuum in the tank and is specially designed to minimize the magnitude of vacuum that can develop inside the tank.

The weight of the "device" can be supported by an external hanger to reduce the load on the tank's roof.

6 Claims, 2 Drawing Sheets

# LIQUID SEAL VENT

BACKGROUND OF THE INVENTION

In many industries, among them electricity generating stations, there is a need to isolate a liquid, stored in liquid storage tanks, from the atmospheric oxygen. An example of this is the storage of demineralized oxygen-free condensate. This condensate must be kept from contact with the atmospheric oxygen, as oxygenated condensate is very corrosive to the piping and equipment through which it flows.

A common practice is to blanket these liquid storage tanks with a low pressure (approximately half inch of water column) blanketing gas, such as nitrogen. Many such tanks are used in installations where the tanks' operability must be preserved under adverse circumstances and, thus, the tanks' pressure relieving devices must be designed for a missile impact. Also, the mechanical failure of these pressure relieving devices must be considered. These requirements lead to very expensive design solutions. Such solutions are, for example, designing the tank to a higher pressure than would otherwise be required, equipping the tank with redundant pressure relieving devices, and protecting those pressure relieving devices with expensive missile barriers.

Additionally, in many cases, a conversion of an atmospheric liquid storage tank to a gas-blanketed tank is desired, combined with the need to preserve the operability of such a tank under adverse circumstances, such as a missile impact and equipment failure. A pressure relieving device for such a tank must have a minimal pressure loss when relieving vacuum in the tank and must not, by its weight and reaction forces, overload the roof of the existing liquid storage tank. Additionally, a minimum of maintenance is desired in most modern plants.

The need of an inexpensive solution of venting gas-blanketed safety-related tanks led to an innovative liquid seal vent design suitable for safety-related installations, designed for missile impact, with a feature of supportability by an external hanger, automatic replenishment of liquid in the liquid seal vent and in the tank's overflow pipe liquid seal, a minimum magnitude of the potential vacuum in the tank, and easy installation on an existing liquid storage tank without cutting the tank's roof or welding to the roof.

Although liquid seal vents were introduced in other previous patents, none of the previous designs are suitable for safety-related gas-blanketed liquid storage tanks, as those vents are not designed to assure that they would function after they are hit by an external missile. Additionally, none of the previous patents considered the feature of upholding the weight of the liquid seal vent by an external hanger, as the weight of the liquid seal vent can exceed the allowable weight on the tank's roof.

Also, none of the previous patents offered a design which automatically replenishes the liquid in the vent to accommodate liquid evaporation. The feature of automatic replenishment of liquid in the tank's overflow pipe liquid seal, by means of the roof liquid seal vent, was also not a part of the previous patents. Additionally, none of the previous patents addressed the need of adding such a vent on an already constructed tank. As many liquid storage tanks are lined internally with special coatings, the installation of the vent by cutting into the tank's roof and welding on the roof is expensive, as during such processes the internal lining is damaged.

The need for minimization of the vacuum that may develop inside the tank has also not been specifically addressed in previous patents, although most tanks have typically much lower allowable pressure in vacuum than in the overpressure.

OBJECTS OF THE INVENTION

The primary object of the invention is to provide a liquid seal vent for gas-blanketed liquid storage tank, whereas the vent will function even after it is hit by an external missile and, thus, can be used in safety-related installations such as nuclear power plants.

Another object is to provide a liquid seal vent which minimizes the need for the maintenance of the liquid in it and minimizes the need for maintaining the liquid level in the tank's overflow pipe liquid seal.

Another object is to provide an automatic overpressure and vacuum relief for a gas-blanketed liquid storage tank, while minimizing the magnitude of vacuum that can develop in such a tank.

Another object is to allow the liquid seal vent to be installed on previously constructed atmospheric liquid storage tanks, which are to be converted to gas-blanketed tanks, without overloading the tank's roof and without cutting or welding on the tank's roof.

DESCRIPTION OF PREFERRED EMBODIMENTS

Figure 1:
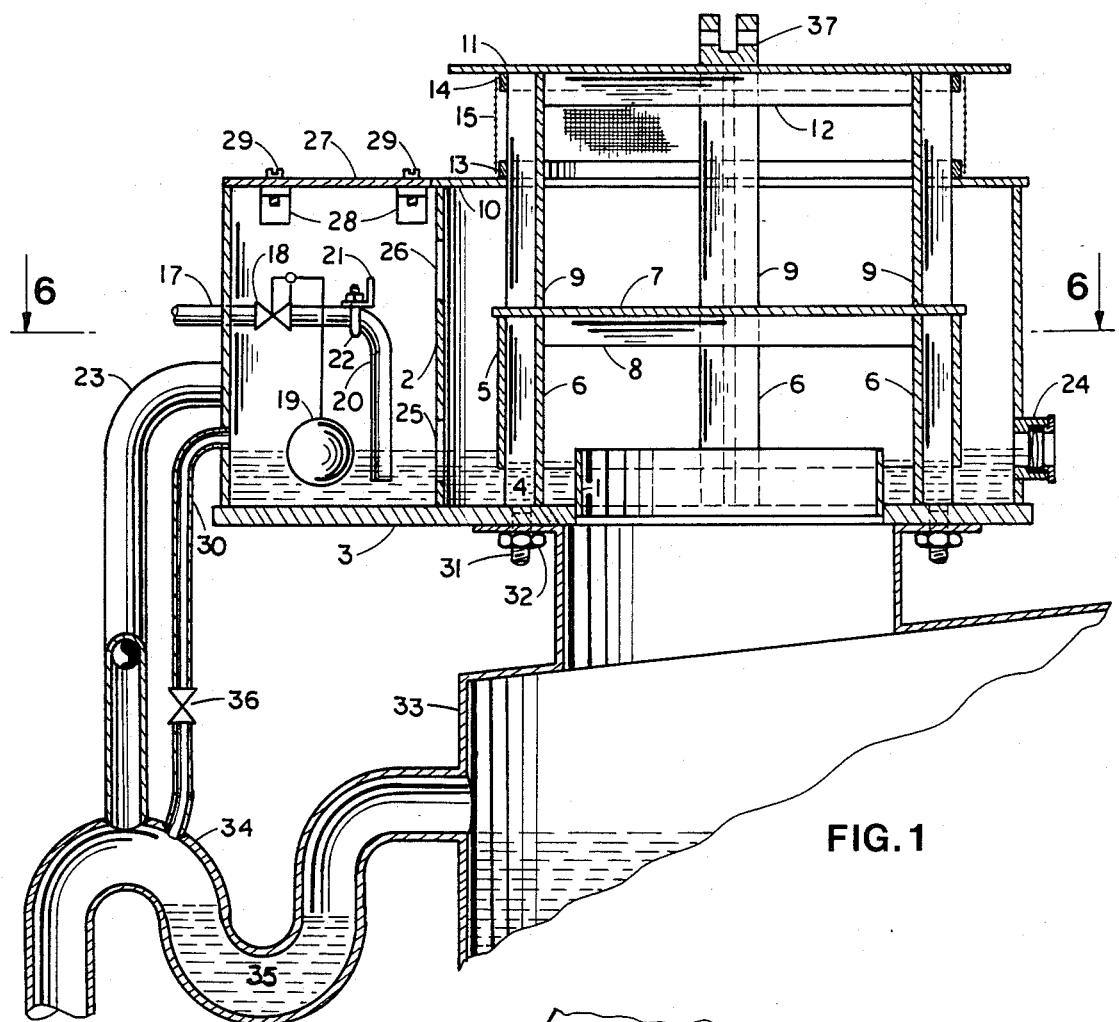
FIG. 1 is a vertical sectional view through the middle of the "device" as installed on the top of a roof flange of a tank.

FIG. 1 shows a cross-sectional view of the "device" as it is placed on the top of a roof flange of a tank. The "device" consists of an inner cylinder 1 and outer cylinder 2 mounted permanently and concentrically on an annular baseplate 3 and containing sealing liquid 4. Into the sealing liquid 4 is submerged a middle cylinder 5, mounted permanently and concentrically in respect to inner cylinder 1 and outer cylinder 2 and supported above the annular baseplate 3 by a plurality of permanently mounted structural members 6 and enclosed on the top by a permanently mounted cover plate 7. The permanently mounted structural member 8 increases the missile load capacity of the "device" and may be missing for smaller missile loads.

On the top of the cover plate 7 is installed a plurality of permanently mounted structural members 9. On the top of the structural members 9 is permanently mounted a top plate 11. A permanently mounted structural member 12 increases the missile load capacity of the "device" as well as reinforces the top plate 11 when the "device" is intended to be supported by an external hanger, to reduce the load on the roof of the tank 33. Support bracket 37, installed on the top plate 11 facilitates supporting the "device" by an external hanger, and it may be also used for lifting the "device" during transportation, etc. The top plate 11 besides serving as a missile barrier may protect the internals of the "device" from rain and, therefore, it may overhang structural members 9. On the top of the outer cylinder 2 is permanently mounted an annular cover 10, joined permanently also with the structural members 9.

A mounting strip 13 is permanently joined with the annular cover 10 and the structural members 9 and it serves as a mounting strip for the attachment of screen 15. The mounting strip 13 also serves as a barrier for rain water. A similar mounting strip 14 is permanently joined to the top plate 11 and structural members 9, and it serves as a mounting strip for the screen 15. The screen 15 prevents nesting inside the "device" by birds and prevents the entrance of other undesirable objects or elements, such as leaves, into the "device."

On the side of the outer cylinder 2 is permanently joined a makeup box 16, permanently mounted on the annular baseplate 3. Into the makeup box 16 is penetrated a liquid makeup pipe 17, which is inside the makeup box 16 connected to a level control valve 18. Although the liquid makeup valve can be of various designs available in the industry, a float-operated valve is shown here to illustrate the function of the "device." The float 19 of the level control valve 18 can be adjusted to obtain the desired liquid level in the "device." On the outlet of the level control valve 18 is a pipe 20, which is supported in place by a structural support 21 and a U-bolt assembly 22.

The makeup box 16 is furnished with an emergency overflow pipe 23, which is sized for the failure of the level control valve 18 in a fully open position.

The liquid level in the makeup box 16 is same as the liquid level between the outer cylinder 2 and the middle cylinder 5 due to one or more cross-connecting openings 25. The liquid level in the "device" can be visually checked by a sight glass 24 or a level gauge of various designs available in the industry. One or more cross-connecting openings 26, located above the expected liquid level in the makeup box 16, serve as vents for the purpose of preventing the overpressurization or underpressurization of the makeup box 16 due to liquid level changes in the makeup box 16.

The makeup box 16 is covered with a removable lid 27 attached by fasteners 29 to brackets 28. The pipe 30 is used for automatic makeup of sealing liquid into the tank's overflow pipe liquid seal 34 to accommodate evaporation of liquid 35. Valve 36 installed in the pipe 30 may be throttled to achieve a required quantity of liquid flow into the tank's overflow pipe liquid seal 34, based on operative experience, as each time the tank's pressure rises above the blanketing-gas set pressure, the liquid overflows from the makeup box 16 into the pipe 30 and into the tank's overflow pipe liquid seal 34. The increase of the tank's internal pressure is caused by increased tank temperature, such as between night and day or by inleting liquid into the tank.

The "device" is shown attached to the roof flange of the tank 33 by means of stud bolts 31, installed in the annular baseplate 3 and nuts 32.

The sealing liquid 4 inside the "device" is illustrated displaced as it would normally be displaced due to a slight overpressure of the blanketing gas inside the tank.

The "device" is designed to maintain its function even after it is hit by a missile. This requires that the gas or air passages inside the "device" be maintained available for the flow of gas or air. Critical are the annular gaps under middle cylinder 5, between annular cover 10 and cover plate 7 and between top plate 11 and annular cover 10. These gaps are assured by structural members 6 and 9 joined to their respective plates and cylinder to form a rigid box. The rigidity of this construction is increased by structural members 8 and 12. The number and size of structural members 6, 9, 8, and 12 correspond to the magnitude of the missile loading for which the liquid seal vent is designed.

Figure 2:
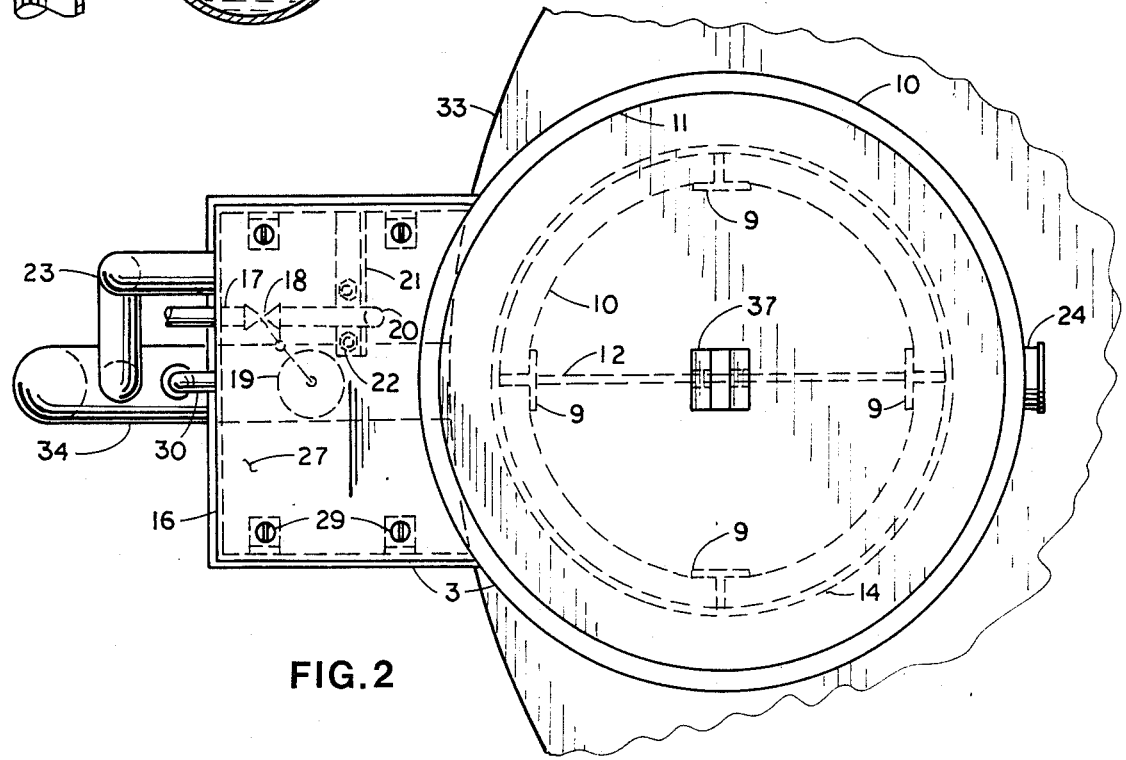
FIG. 2 is a plan view of the "device."

FIG. 2 shows the location of structural members 9 respective to the middle cylinder 2, as well as the location of makeup box 16. Various modifications of the shapes and quantity of support members 9 can be made without departing from the spirit of this invention. Similarly, the shape of the makeup box 16, attachment of the lid 27 to the makeup box 16, and arrangement and shape of components inside the makeup box 16 can be modified without departing from the spirit of this invention.

The emergency overflow pipe 23 and the pipe 30 are connected to the tank's overflow pipe liquid seal 34 on the atmospheric side of the liquid seal 34 in order to prevent the escape of the slightly pressurized blanketing gas from the tank 33.

Figure 3:
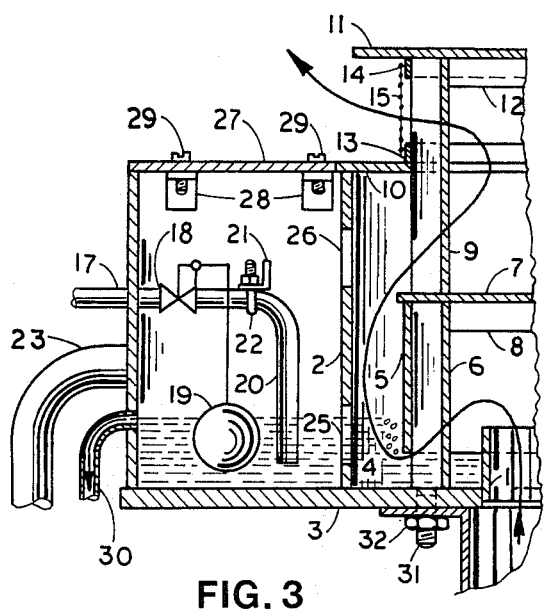
FIG. 3 is a partial sectional view showing the compressed gas path and the liquid levels inside the "device" when the tank's internal pressure exceeds the set pressure of the blanketing gas.

FIG. 3 illustrates the levels of the sealing liquid 4 when the overpressure inside the tank 33 exceeds the set pressure of the blanketing gas. In such a condition, the blanketing gas escapes under the middle cylinder 5 and then continues flowing through the "device" to the atmosphere, as is illustrated by the gas path curve. Also, the liquid level in the makeup box 16 raises during this condition allowing the sealing liquid to enter the pipe 30, thus, replenishing the liquid in the overflow pipe liquid seal. The liquid overflowed from the makeup box 16 will be replaced by the level control valve 18 when the pressure in the tank 33 returns to the blanketing gas set pressure. The flow of gas, as illustrated in FIG. 3, whips up liquid droplets along the inside wall of the outer cylinder 2. The reason for the annular plate 10 is to minimize the carryover of the liquid with the gas.

Figure 4:
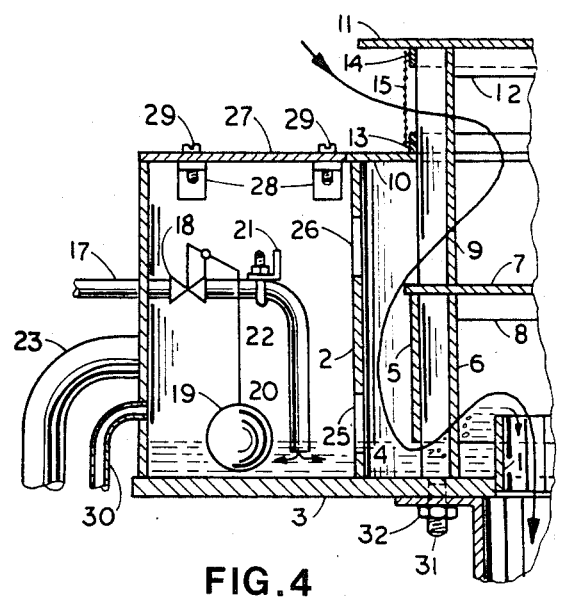
FIG. 4 is a partial sectional view showing the path of atmospheric air and the liquid levels inside the "device" when vacuum develops in the tank.

FIG. 4 illustrates the liquid levels inside the "device" when vacuum exists in the tank 33. The vacuum can occur in the tank if the blanketing gas pressure regulating valve fails in closed position just in the time when the liquid is being withdrawn from the tank. Under such conditions, the atmospheric air is drawn through the "device" into the tank 33. As the allowable pressure in vacuum for large atmospheric tanks is very small, the vacuum in such tanks must be minimized. To minimize the vacuum in the tank 33, the distance between the top of the inner cylinder 1 and the bottom of the middle cylinder 5 should be only slightly greater than one half of the blanketing gas overpressure, with the overpressure expressed as an equivalent height of the liquid column.

Figure 5:
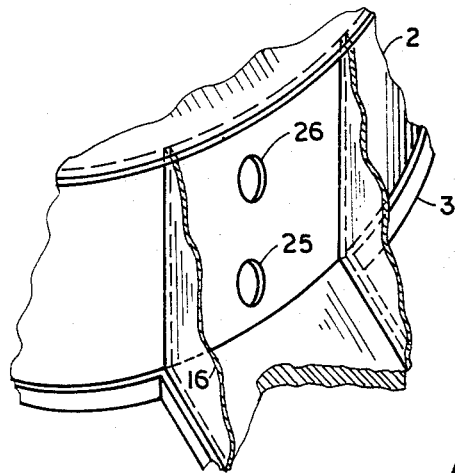
FIG. 5 is a partial isometric view of the "device," showing the cross-connection openings between the outer shell and the makeup box.

FIG. 5 is a partial isometrical view showing the cross-connecting openings 25 and 26 installed in the outer cylinder 2. A cross-connecting opening 25 allows liquid flow between the makeup box 16 and the annular chamber formed by the outer cylinder 2 and the inner cylinder 1. Also, the cross-connecting openings 25 and 26 assure that the liquid level between the outer cylinder 2 and the middle cylinder 5 is the same as the liquid level in the makeup box 16.

A cross-connecting opening 26 functions as a vent, as it is installed above the expected levels of sealing liquid 4. The cross-connecting opening 26 prevents overpressurization or underpressurization of the makeup box 16, respective to the atmospheric pressure, due to liquid level changes in the makeup box 16.

Although only one cross-connecting opening 25 and one cross-connecting opening 26 are shown, more openings can be provided without changing the spirit of this invention.

Figure 6:
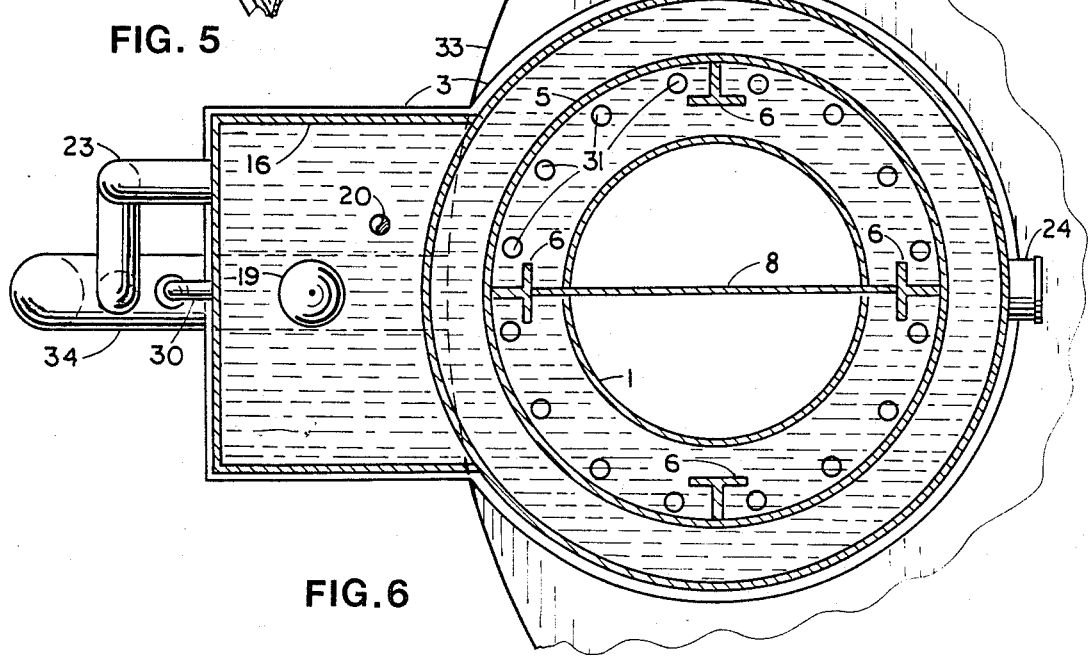
FIG. 6 is a horizontal sectional view taken on a plane indicated by line 6—6 in FIG. 1.

FIG. 6 shows a horizontal cross-section of the "device" showing components below the cover plate 7. The size and quantity of the structural members 8 are dependent on the desired missile loading capacity. For small missile loads, the structural member 8 can be missing, while for large missile loads a plurality of structural member 8 may have to be installed between the plurality of structural members 6.

Although the figures included in this specification show a cylindrical "device," the liquid seal vent would also be functional using other shapes. The cylindrical shapes were selected as preferred shapes, because they allow using standard piping products for the construction of the "device."

While I have shown and described the preferred embodiments of my invention, it is understood that modifications may be made in the details of the construction without departing from the spirit of the invention and the scope of the appended claims.

I claim:

1. A liquid seal vent valve mounted on a gas-blanketed liquid storage tank, comprising three stationary vertical cylinders of different diameters and heights, the stationary outer and inner cylinders are concentrically permanently mounted upon a stationary annular baseplate forming an annular chamber filled with a sealing liquid to a predetermined height, into such liquid and between the inner and outer cylinders is partially submerged the middle cylinder, the middle cylinder maintained in its position by a plurality of structural mounting means, the middle cylinder is closed at the top by a pressure-tight cover, while the height of the inner cylinder is determined by the need to provide adequate distance between the bottom of the middle cylinder and the annular baseplate for means of allowing a passage of gas or air through that annular opening with a very small pressure drop, while the height of the middle cylinder's cover is determined by the need to allow passage of air or gas into or out of the atmosphere with a very small pressure drop, the outer cylinder is covered at its top by an annular cover with a circular opening at least as large as the diameter of the inner cylinder, the top of the outer cylinder's annular cover being higher than the top of the middle cylinder's cover to allow passage of air or gas through the resultant annular space with a very small pressure drop, the structural mounting means are vertically mounted on top of the middle cylinder's cover and extend to and are permanently joined with the stationary outer cylinder's annular cover, a top plate is permanently mounted on the top of these structural mounting means, sufficiently high above the circular opening of the outer cylinder's annular cover to allow passage of air or gas with a very small pressure drop, between the top plate and the outer cylinder's annular cover on the outside of the structural mounting means is positioned a protective screen and the structural mounting means below the top plate and below the middle cylinder's cover plate are cross-connected by one or more structural reinforcing means.

2. A vent valve as claimed in claim 1, wherein the level of the sealing liquid inside the annular chamber is visible by a sight glass mounted on the outer cylinder and the level is maintained by a level control valve means positioned inside a makeup box attached to the side of the outer vertical cylinder, the space inside the makeup box is cross-connected with the annular space formed by the outer and middle vertical cylinders by one or more cross-connecting openings having their center at the elevation of the normal liquid seal level and one or more cross-connecting vent openings having their center above the normal liquid seal level, the makeup box is fitted with an outlet pipe with the bottom located only slightly above the normal liquid level in the makeup box for the purpose of supplying sealing liquid into an overflow pipe liquid seal of the tank each time the liquid level in the makeup box raises due to increased pressure in the tank and the makeup box is fitted with one or more emergency overflow pipes for the purpose of relieving the liquid level in the makeup box upon failure of the level control valve in an open position.

3. A vent valve as claimed in claim 1, wherein the annular baseplate and the structural mounting means and the structural reinforcing means and the outer cylinder and the middle cylinder and the top plate and the outer cylinder's annular cover and the middle cylinder's cover are adequately strong when they are joined together to allow maintaining the venting function even after being hit by a specific external missile.

4. A vent valve as claimed in claim 1, wherein one or more suitably attached structural bracket means or structural attachment means facilitate uplifting of the weight by external hanger means or lifting means.

5. A vent valve as claimed in claim 1, wherein the top of the inner cylinder is higher than the bottom of the middle cylinder and the distance between the top of the inner cylinder and the bottom of the middle cylinder is larger than zero and smaller than the design vacuum pressure of the tank, with such a pressure expressed in the equivalent height of the sealing-liquid, for means of minimizing this distance and for means of minimizing the magnitude of possible vacuum in the tank.

6. A vent valve as claimed in claim 1, wherein the annular base plate is attached to the tank's roof vent by suitable attachment means, including the bolting means by use of stud bolts fitted in the annular baseplate.

* * * * *